Patented July 21, 1931

1,815,227

UNITED STATES PATENT OFFICE

JAMES J. BARRY AND WILLIAM T. MURRAY, OF GLOUCESTER, MASSACHUSETTS, ASSIGNORS, BY MESNE ASSIGNMENTS, TO FROSTED FOODS COMPANY, INC., OF DOVER, DELAWARE, A CORPORATION OF DELAWARE

METHOD OF PREPARING FOOD PRODUCTS

No Drawing.  Application filed January 5, 1927. Serial No. 159,238.

This invention relates to methods of preparing food products, and particularly to the preparation thereof for canning.

Heretofore, considerable difficulty has been experienced in canning of certain food products of which fish perhaps heads the list, because of the black spots or black coating which appears in the cans when opened, either in the product, on the can, or both. This difficulty has occurred because of the presence of hydrogen and sulphur or hydrogen sulphide in the product after canning and of iron in the container. Free hydrogen and sulphur combine to form hydrogen sulphide ($H_2S$), and this being acid in nature attacks the iron of the container forming iron sulphide (FeS) which is black. Heretofore efforts have been directed to the prevention of this black deposit or of these black specks by preventing the fish or other product coming in contact with the container. Some have used lacquered cans, others have lined the cans or wrapped the product as with parchment, and others have both lacquered the cans and lined them. Such means are, however, merely temporary and unsatisfactory preventatives and not unfailing cures of the trouble.

Our invention has for its objects to eliminate the formation of sulphides, particularly iron sulphide, in the canned product; to eliminate free sulphur from the product; to enable use of ordinary tin cans with such products as fish, corn and so forth; to eliminate the cause for formation of black spots or coating in such products; to avoid the inconvenience, expense and uncertainty of lacquered cans or cans with lining therein; to provide a product which has neither the appearance or taste of having been treated with any preservative substance; to avoid incorporation of any preservative substances in the canned product; to secure the elimination of the sulphur in the same process by which the product is otherwise prepared for canning; to secure simplicity of operation and fulfillment of the purposes and steps of the invention; and to obtain other advantages and results as may be brought out in the following description.

In carrying out our invention, we prepare the product for canning by cooking or heating the product at adequate temperatures. By preference, this cooking or heating is sufficient to loosen the fish flesh from the bones, to eliminate surplus moisture, or to accomplish other desirable results in the preparation of the product for canning. Preferably, also, this heating or cooking of the product is performed in the presence of lead, as in a lead container. As a result of use of lead in this heating of the food product, the free sulphur in the product is eliminated and the black spots or coating will not appear in the cans in which the product is next sealed, even if unlined or unlacquered cans are used.

It appears that the reactions resulting from carrying out our process are substantially that by cooking or heating the product the sulphur therein unites with oxygen of the air or within the vessel in which the process is being carried out, forming sulphur di-oxide ($SO_2$). That in turn would appear to unite with hydrogen, forming the electrolytic compound of sulphurous acid ($H_2SO_3$). Likewise, the heat has caused the lead surface to become oxidized, forming lead oxide (PbO) which unites with the sulphurous ion forming lead sulphate ($PbSO_4$). Free sulphur is thus eliminated by this process, and canning of the product is thereafter completed in the usual way.

While we have indicated above that the process is carried out by heating in the presence of lead simultaneously with cooking or sterilization of the product, it is obvious that these steps may be taken separately, and that the heating may be by boiling, steaming, or otherwise, and also that other detail changes and modifications may be made in carrying out our process, both as to the steps performed or the order of performing such steps, and we do not wish to be understood as limiting ourselves to such details except as set forth in the following claims when construed in the light of the prior art.

Having thus described the invention, we claim:—

1. The hereindescribed method of preventing black deposit in cans of canned food products, comprising heating the product in the presence of lead.

2. The hereindescribed process of preventing black deposit in cans of canned food products, consisting in combining sulphur of the product with lead.

3. The hereindescribed method of preventing black deposit in cans of canned food products consisting in forming lead sulphate with the sulphur contained in said product.

4. The hereindescribed method of preventing black deposit in cans of canned food products, consisting in heating the food product in a lead container.

5. The hereindescribed method of preventing black deposit in food products after canning, consisting in boiling the product in the presence of lead, and thereafter canning said boiled product.

6. The hereindescribed method of preventing black deposit in cans of canned food products, consisting in steaming the food product prior to canning with the food product in the presence of lead while being steamed, and canning said product after said steaming.

WILLIAM T. MURRAY.
J. J. BARRY.